(12) United States Patent
Fischer

(10) Patent No.: US 12,717,693 B2
(45) Date of Patent: Aug. 25, 2026

(54) PROACTIVE SOFTWARE PERFORMANCE EVALUATION AND SUPPORT

(71) Applicant: SAP SE, Walldorf (DE)

(72) Inventor: Uwe Fischer, Nussloch (DE)

(73) Assignee: SAP SE, Walldorf (DE)

( * ) Notice: Subject to any disclaimer, the term of this patent is extended or adjusted under 35 U.S.C. 154(b) by 495 days.

(21) Appl. No.: 18/315,941

(22) Filed: May 11, 2023

(65) Prior Publication Data

US 2024/0378129 A1 Nov. 14, 2024

(51) Int. Cl.
*G06F 11/34* (2006.01)
*G06F 11/30* (2006.01)

(52) U.S. Cl.
CPC ........ *G06F 11/3447* (2013.01); *G06F 11/302* (2013.01)

(58) Field of Classification Search
CPC ............... G06F 11/302; G06F 11/3409; G06F 11/3447; G06F 11/3452; G06F 2201/865
USPC .......................................................... 702/186
See application file for complete search history.

(56) References Cited

U.S. PATENT DOCUMENTS 10,338,913 B2 * 7/2019 Franchitti ............... H04L 67/34
10,778,552 B2 * 9/2020 Dutta .................. H04L 43/0852
2016/0328641 A1 * 11/2016 AlSaud .................... G06N 3/08
2019/0045192 A1 * 2/2019 Socek ................. H04N 19/573

* cited by examiner

*Primary Examiner* — John H Le
(74) *Attorney, Agent, or Firm* — Fountainhead Law Group, PC

(57) ABSTRACT

Software performance evaluation and support is achieved proactively in a cloud architecture by collecting Key Performance Indicators (KPIs) of software performance across multiple tenants. Such software performance KPIs can include but are not limited to data volumes, backend calculation runtimes, and front end request runtimes. Influencing factors of a software performance model (e.g., model complexity, calculation complexity; application complexity) may be gathered. The collected data is referenced as a training corpus to create an Artificial Intelligence (AI) revealing correlation between model characteristic(s) and software performance. The AI is applied in the form of predictive analytics and/or Robotic Process Automation (RPA) to proactively identify software performance challenges and issue alerts. Embodiments may define lower thresholds and/or performance degradations that result in alert triggering. Correlating software performance model characteristics to KPIs highlights frequently-arising modelling issues. Application designers, software vendors, and end-users can receive modeling feedback/support early enough to make relevant adjustments.

20 Claims, 7 Drawing Sheets

PROACTIVE SOFTWARE PERFORMANCE EVALUATION AND SUPPORT

BACKGROUND

Unless otherwise indicated herein, the approaches described in this section are not prior art to the claims in this application and are not admitted to be prior art by inclusion in this section.

Software platforms are evolving to become ever more complex and interrelated across larger landscapes. While software can provide a variety of valuable functions, problems with any one of those functions can end up disrupting the user's experience.

Software performance may be driven by one or more factors such as data volume, data complexity, parallel usage, hardware, compute power, and network issues. Such factors can be difficult to control, and moreover may evolve dynamically over time.

SUMMARY

Software performance evaluation and support is achieved proactively in a cloud architecture by collecting Key Performance Indicators (KPIs) of software performance across multiple tenants. Examples of such software performance KPIs can include but are not limited to data volumes, backend calculation runtimes, and front end request runtimes. KPIs of a model (e.g., model complexity, calculation complexity; application complexity) may also be gathered. This collected data is referenced as a training corpus to create an Artificial Intelligence (AI), thereby revealing correlation between model characteristic(s), system parameters and software performance. Once trained, the AI is applied in the form of predictive analytics and/or Robotic Process Automation (RPA) to proactively identify software performance challenges and issue relevant alerts and potential solution indicators to users (e.g., software designers or end users).

Particular embodiments may define lower thresholds (e.g., bottom %) and/or performance degradation that result in triggering of alerts. Correlating software performance model characteristics to KPIs makes a user aware of frequently-arising modelling issues relevant to a particular application. In this manner, during implementation application designers can receive feedback and support on modeling early enough to make adjustments. As a result, the software application may be optimized with respect to features and/or performance, leading to an improved user experience.

The following detailed description and accompanying drawings provide a better understanding of the nature and advantages of various embodiments.

DETAILED DESCRIPTION

Described herein are methods and apparatuses that implement software performance evaluation. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
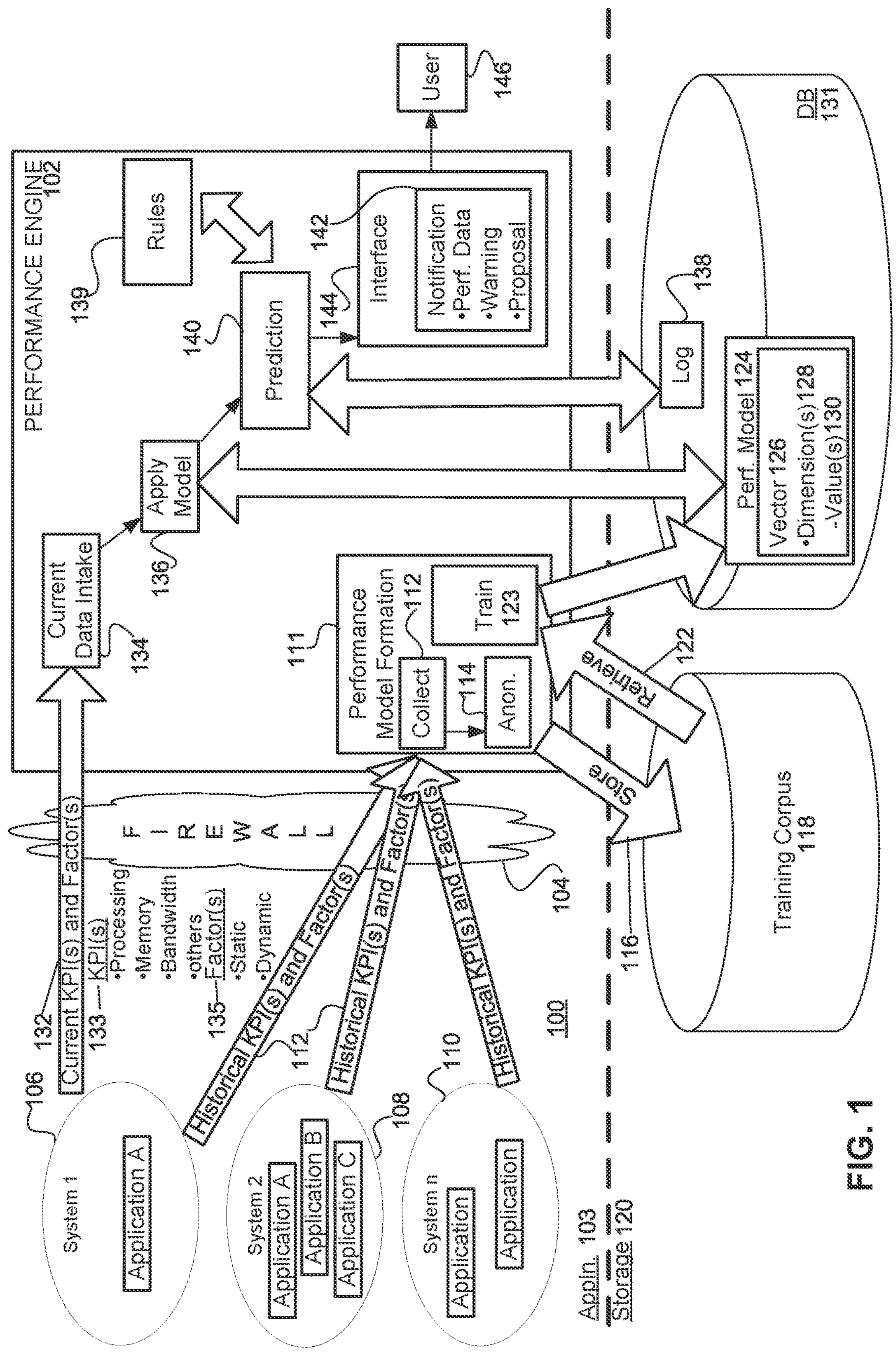
FIG. 1 shows a simplified diagram of a system according to an embodiment.

FIG. 1 shows a simplified view of an example system that is configured to implement software performance evaluation and support according to an embodiment. Specifically, system 100 comprises a performance engine 102 in an application layer 103, that is in communication across a firewall 104 with a plurality of different systems 106, 108, and 110, which may belong, e.g., to different tenants.

The systems run various software applications (e.g., A, B, C). As part of formation 111 of a model of software performance, the performance engine collects 112 from the systems, historical as well as live-KPIs and influencing factors reflecting the operation of the software applications on the different systems. The data may be collected live or post-mortem.

The performance engine then anonymizes 114 the collected KPIs/factors. The anonymized data is stored 116 in a training corpus 118 of a storage layer 120.

The performance engine then retrieves 122 the data from the training corpus, and exercises artificial intelligence principles to train 123 the software performance model 124. The software performance model comprises a vector 126 that includes various dimensions 128 having respective values 130. The model is stored in a database 131 of a storage layer 120. The software performance model 124 is updated by recent data collected in the training corpus 118 on a periodic base, where the period can arbitrarily defined as a balance between the required compute power and the actuality of the model.

Next, the performance engine determines ongoing performance of the particular software application by collecting current performance data 132 as part of an intake 134. The current performance data that is collected may comprise software KPIs 133 and influencing factors 135 (which may be static or dynamic in nature, as is described further below).

The engine then applies 136 the trained model to the current performance data to generate a result that is stored in a log 138. The log may be present in the database.

The log and a ruleset 139 may be referenced by the engine to create a prediction 140 of software performance according to the model. Based upon the prediction, the performance engine may communicate output 142 (e.g., a notification including performance data, a warning, or even a proposed action) via interface 144.

A user 146 (e.g., designer of the software) receives this output and in turn may take action. Examples of such action can be to analyze the performance data, and/or accept a proposal offered in the notification, such as restricting a data filter in the application or reducing the model complexity by simplifying calculations.

Figure 2:
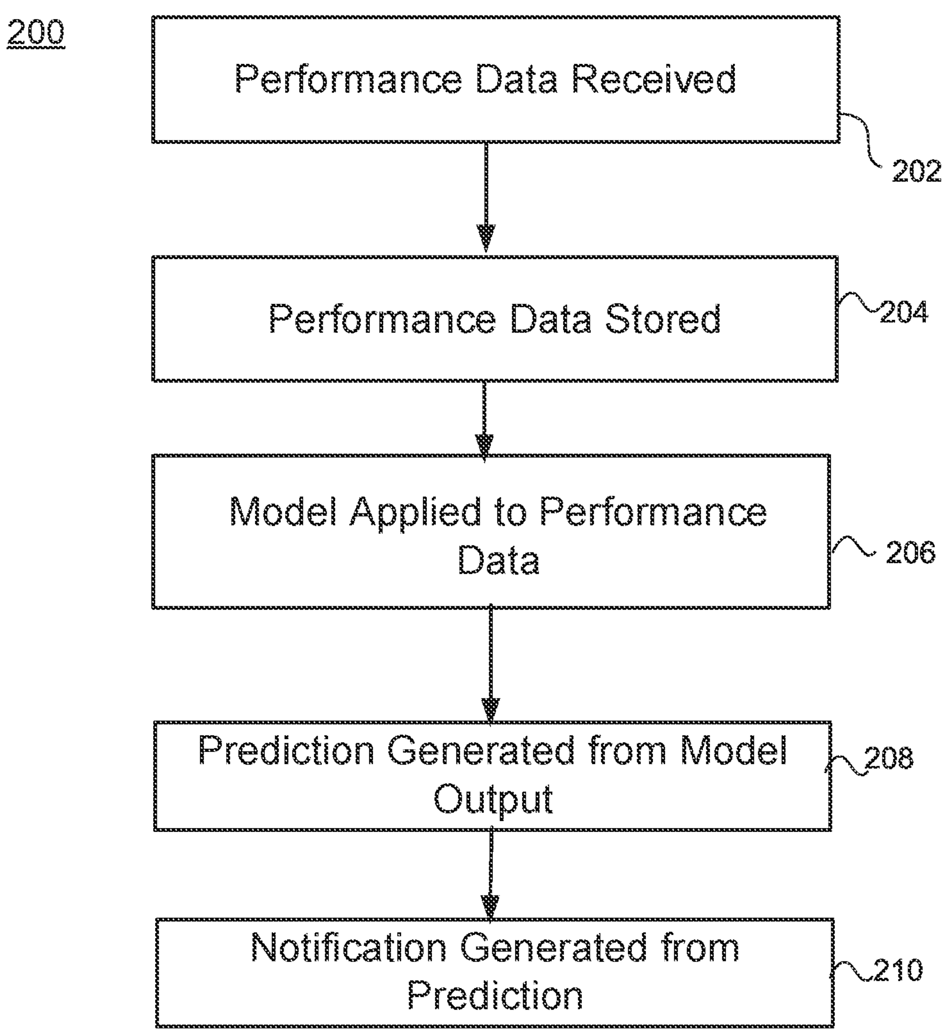
FIG. 2 shows a simplified flow diagram of a method according to an embodiment.

FIG. 2 is a flow diagram of a method 200 according to an embodiment. At 202 performance data of execution of a first software application is received.

At 204, the performance data is stored in a non-transitory computer readable storage medium. At 206, a performance model is applied to the performance data.

At 208, a prediction is generated from an output of the performance model and stored in a log. At 210, at notification based upon the prediction is provided.

Further details regarding software performance evaluation and modeling according to various embodiments, are now provided in connection with the following example. In this particular example, software performance evaluation and support are implemented with the SAP Analytics Cloud in-memory database available from SAP SE of Walldorf, Germany.

EXAMPLE

Figure 3:
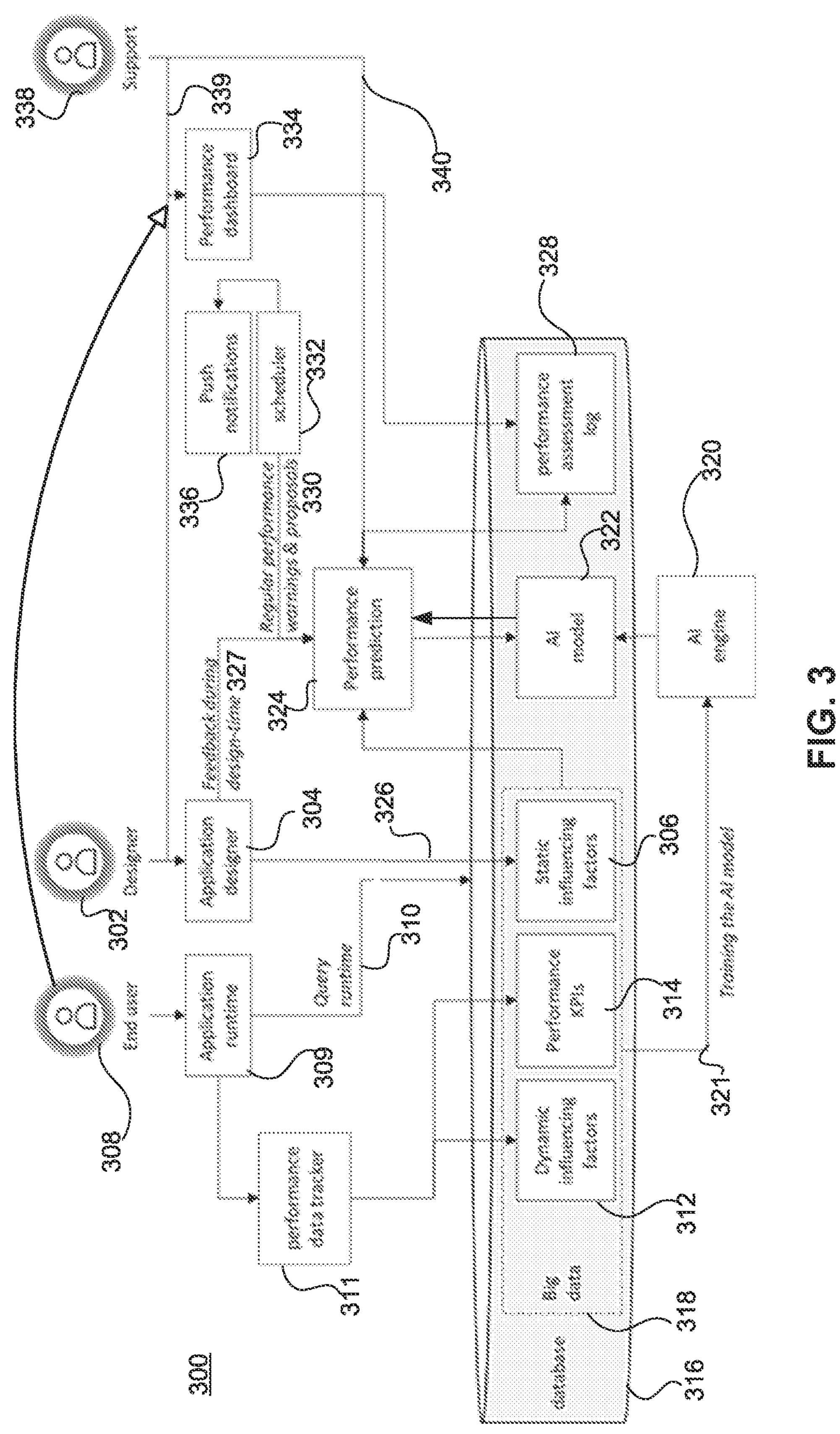
FIG. 3 shows an example of a system implementing software performance evaluation and support according to an embodiment.

FIG. 3 shows a simplified architecture of a system 300 that is configured to implement software performance analysis and support according to an example. Specifically, the designer 302 works with the application designer component 304 creating the application, which comprises the static influencing factors 306 of the application. Additional static influencing factors may arise from the system setup by a system administrator, such as storage, memory, compute power and workload management.

The end-user 308 uses the application runtime 309 to query 310 the application at runtime.

The performance tracker component 311 is attached to the application runtime. The tracker component tracks the dynamic influencing factors and the performance KPIs. Dynamic influencing factors could be the number of concurrent users in that moment, and the query parameters. The performance KPI may be client response time and server compute time.

These dynamic influencing factors 312 and performance KPIs 314 are stored in the database 316. These influencing factors and KPIs make up the big-data 318, the training corpus.

The big-data are consumed by the AI engine 320 to train 321 the AI model 322. The AI model is stored on the database.

The performance prediction component 324 is triggered by the application design-time or the application runtime 309. The end-user may receive feedback from the system regarding how to query in a more performant manner. The performance prediction component reads the (static; dynamic) influencing factors and applies the AI model for the correlation and performance assessment.

The result is displayed in the application designer to give feedback 327 during design-time or during runtime. The result is also stored in performance assessment log 328.

For regular performance warnings and proposals 330, a scheduler 332 triggers the performance prediction component. The scheduler reads the big-data for the specific customer (e.g., tenant) and application and applies the AI model.

The result is stored in the performance assessment log. The log can be accessed by the designer via the performance dashboard 334.

In addition, the system actively sends (push) notifications 336, e.g. to the designer.

The support engineer 338 accesses 339 the performance assessment via the performance assessment dashboard. In addition, the engineer actively triggers 340 the performance prediction for the current issue.

Further details regarding the example are now described. Based upon performance tracking data, pattern recognition is applied using Machine Learning.

The performance data is tracked (anonymously) from one or more of:

- productive customer tenants,
- concrete customer incidents, and
- internal testing.

The pattern recognition may be based upon KPIs. Examples can include but are not limited to:

- front-end response time,
- backend compute time,
- memory consumption,
- complexity of the data model (e.g. number of dimensions in a multi-dimensional model),
- complexity of the calculation model,
- data volume,
- data topology, and
- number of concurrent users KPIs can correlate with the performance experienced in the scenarios. The system applies those patterns on customer scenarios in order to classify high-, medium-, and low-performance risk.

In addition to such a static view, the system compares the development of a performance risk over time. In this manner, it can track the impact of a changed influencing factor on the resulting performance.

According to one possible example, the system may, e.g., see the data volume increasing as with another customer group earlier, before it led to performance issues. Such assessment may be done regularly (e.g., daily).

Embodiments may particularly address one or more of the following use-cases.

Feedback during design-time (pro-active). As a designer builds the application on the customer side, it applies the pattern on the modeled scenario. A traffic-light in the designer indicates the performance risk at the time of design. This will allow the designer to factor into their design-time, the mass knowledge of performance implications.

Regular performance warnings & proposals from the system (pro-active). The regular pattern recognition and customer scenario analysis results into pro-active notifications to the customer on high-performance risks, and medium-performance risks exhibiting a worsening trend. Such notification is provided in an administration monitor of the tenant (dashboard) and pushed via e-mail to interested users. Such notification can also provide proposals for performance improvements, based upon the pattern and the correlation between influencing factor changes and impact on performance. Such proposals could be, but are not limited to:

- a reduction of calculation complexity, or
- a reduction of concurrent usage.

Automated suggestions during support (fast re-active). Where pro-active measures fail, the customer may still raise an incident. The system shares the risk-assessment with the support engineer of the incident. Here the support engineer gets immediate first-hand information in-depth, of the customer scenario as well as the information which notifications have been given. Thus even support of a lower level, will be able to assess and give guidance to the customer (or at least understand what the customer did) when responding to issued notifications. This increases responsiveness and accuracy of support, leading to higher customer satisfaction.

To ensure data privacy, customers may assent to their performance KPIs being used for the pattern recognition. In turn, customers benefit from the pro-active performance assessment. Data may be anonymized, such that details of customer data are not trackable.

Details regarding the structure of performance data in the example, are now described. The performance of customer scenarios can be driven by a variety of influencing factors, including but are not limited to:

number of table entries,
number of calculations,
complexity of calculations,
number of concurrent users,
sizing of the system,
size of the result-set,
complexity of the query.

In a multi-dimensional model-driven analytical scenario, such factors could be, for example one or more of:

number of facts,
number of dimensions,
number of model calculations,
complexity of model calculations,
number of frontend calculations,
complexity of frontend calculations,
number of concurrent users,
sizing of the system,
size of the result-set,
complexity of the analytical query.

Some influencing factors are static in nature. These may depend upon the performance model itself (e.g., a number of dimensions).

Other influencing factors are dynamic in nature. These may depend on the concrete system situation at runtime (e.g., the presence of a concurrent user).

Together, the influencing factors form a n-dimensional vector. The dimensions of the vector represent any of the influencing factors. The number n of dimensions represents the number of different influencing factors tracked by the system and represented in the performance model.

Static influencing factors may be based on the architecture as-designed. The dynamic influencing factors may be collected at runtime by a performance data tracking component.

The influencing factors themselves may not be specific to the concrete customer tenant, model, or scenario. Values of these factors are relevant to the tenant/model/scenario.

Figure 4:
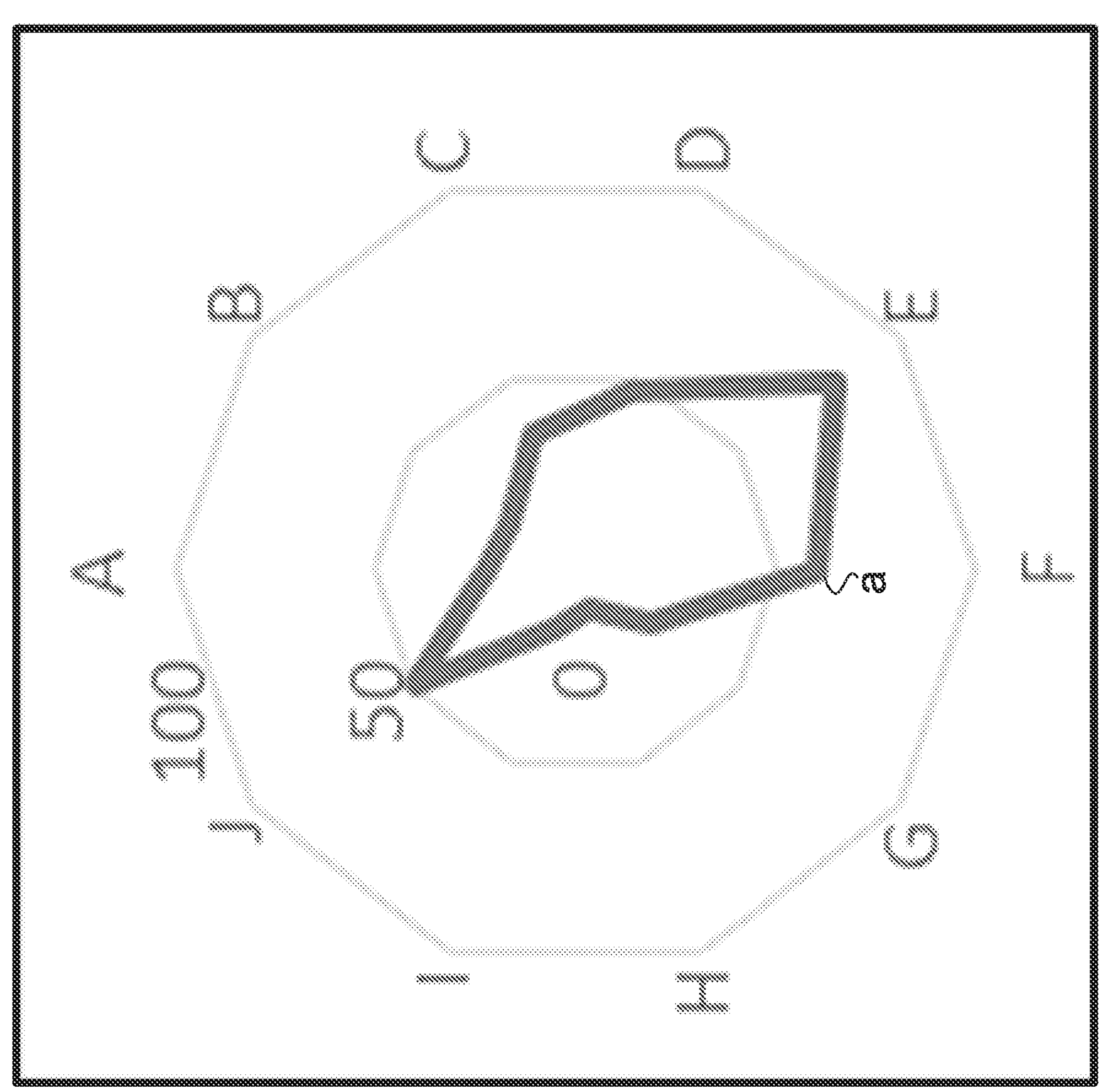
FIG. 4 shows a simplified view of a model vector under a single scenario according to the example.

FIG. 4 shows a simplified representation of a vector comprising influencing factors. Here, the dimensions A-J in this example represent the ten (10) influencing factors of this example.

The structure of the vector is the same for any such application. Here, the solid line represents the concrete values for each of those influencing factors under a particular customer scenario a.

The values per dimension are pure numbers. There is no judgement of what leads to good or bad performance, or how much these values correlate to performance.

In addition to those influencing factors, actual resulting performance KPI could be:

runtime,
memory consumption, or
storage.

The performance KPIs are collected by the performance data tracking component. The n-dimensional vector is assigned to the performance KPI.

Execution of a large number of scenarios, offers a database of many such n-dimensional vectors with performance KPIs assigned. In a public cloud environment, the data may comprise the (anonymized) data of many customer tenants with many models and scenarios, thereby forming a big-data foundation.

Correlation(s) between driving factors and performance KPIs may be identified. The n influencing factors of performance, drive performance in a different way. To afford performance prediction, embodiments determine how influencing factors drive performance.

For this, the system trains an AI model with the existing historical data from the big-data performance tracking. The AI learns from the past actual performance data, approximately how the influencing factors contribute to the performance.

The more data and the more influencing factors that are considered, the better the AI model will become, and the more accurate the correlating factors will be predicted.

Figure 5:
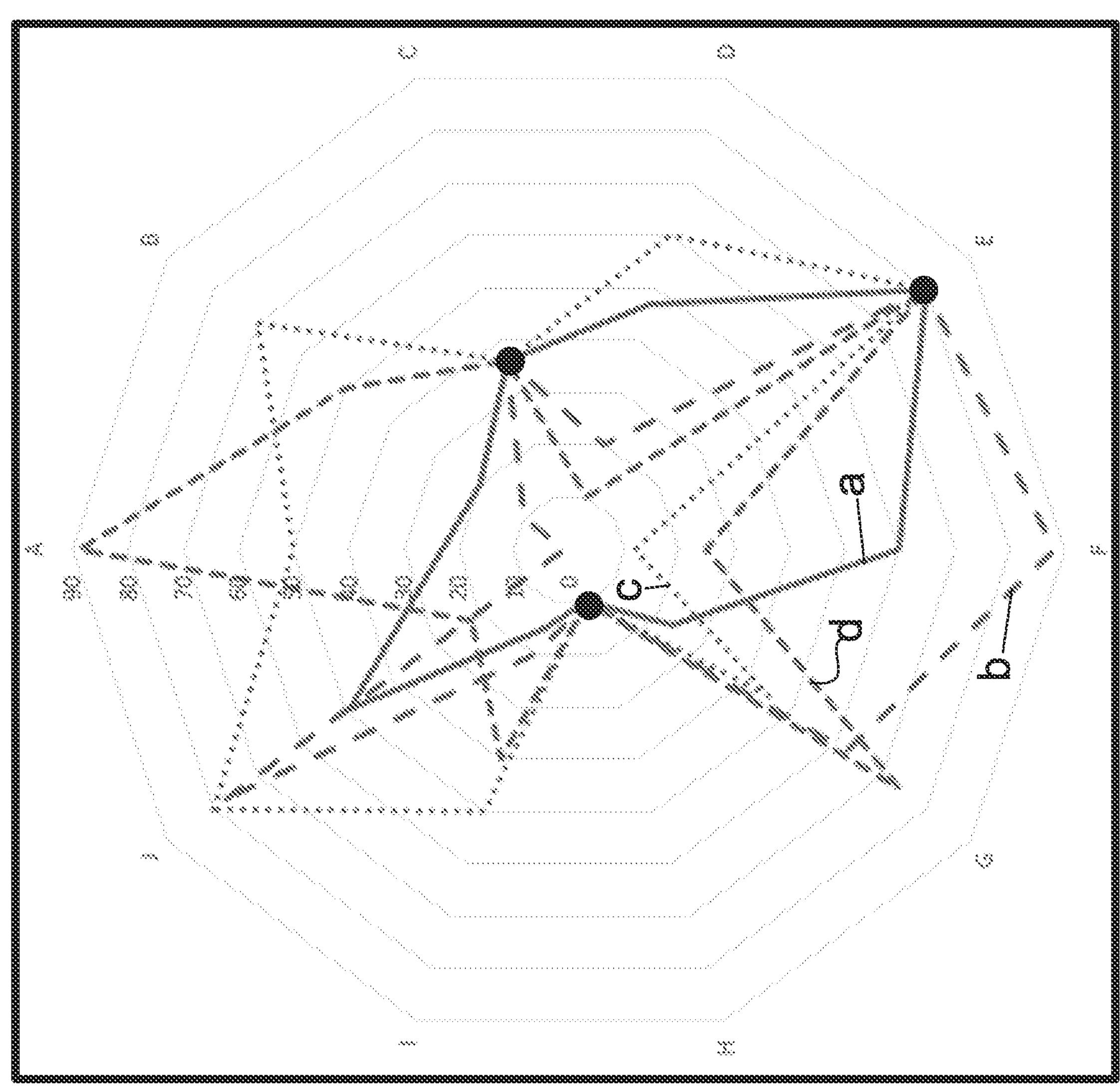
FIG. 5 shows a simplified view of model vectors under multiple scenarios according to the example.

This can be explained by simplifying (e.g., grouping together multiple scenarios with the same performance—e.g., same value of a performance KPI), as shown in FIG. 5. Here, the dimensions C, E, and H share a same common value amongst the four different scenarios (a-d) shown in this chart.

value of dimension C=37;
value of dimension E=80;
value of dimension H=12.

This result suggests that those dimensions (C; E; H) are contributing most to the performance. (They are the same across all of the different scenarios a-d). From additional data, one or more of the following may also be able to be determined:

whether or not these particular dimensions drive performance with (dis)similar weights;
the degree to which other dimensions do/do not drive performance;
the degree to which other dimensions drive performance with a mixture of positive and negative correlation.

Similarly, embodiments correlate scenarios with different performance. Dimensions having a same value under these conditions, drive performance little. For the others, we can derive the weighting factors and correlations.

The result of the AI training is a model that tells how the influencing factors drive performance. This result could be, but is not limited to:

individual weighting factors,
negative and positive correlation between dimensions, and
linear and non-linear dependencies.

This model can reproduce the performance KPI for a given vector of influencing factors in a highly approximating way.

Once it is trained, the AI model may be applied as follows. Using the AI model, the performance of a concrete customer scenario can be calculated. For the specific concrete use-cases that were described above, this can work in the following ways.

Feedback during design-time (pro-active). As a designer builds the application on the customer side, embodiments receive the static influencing factors from the design time. Since this happens during design-time, the system does not have the dynamic influencing factors. The embodiment can compare the predicted performance-range under the given factors (independent of the dynamic ones), with the overall performance range of the same KPI. This comparison allows a rough judgment as to whether overall performance for this model is expected to be good, medium, low, or any range in-between. In addition, the system takes the average dynamic influencing factors (e.g., concurrent user and compute power) of this customer system, to correlate it with other systems of similar situation. This makes the prediction even more accurate. This comparison is technically performed using the AI model, based on the calculated correlations. This affords early feedback to the designer, avoiding poor performance during design-time. The system stores and records such feedback given to the designer in a performance assessment log per customer.

Regular performance warnings & proposals from the system (pro-active). Some of the dynamic influencing factors develop over time. For example, larger business coverage leads to higher volumes of fact data and more dimensions, that influence performance. Based on the historic development of those factors, the system forecasts the future development of this factor by correlating it with the similar situations of other systems/tenants. Based on the forecasted influencing factor and the other static dimensions, the system predicts whether the change will lead to a performance degradation or improvement, as above. The AI model is the way of performing this comparison. Based on changed dynamic influencing factors, the system forecasts the performance of the scenario and gives warning to the designer in a dashboard or via notification. The system stores and records such feedback given to the designer in a performance assessment log per customer.

Furthermore, system performance may be modeled using a variance calculation for all influencing factors, by applying the AI model to a slight change in any of the dimensions and comparing the performance predictions for the model. By comparing the performance impact, the system provides a hint regarding which changed influencing factor has the highest impact on performance improvement. For example, the embodiment may suggest higher sizing or reduction in calculation complexity. The system stores and records such suggestion in a performance assessment log per customer.

Automated suggestions during support (fast re-active). In case all pro-active measures failed the customer may still raise an incident. The system provides the information of the performance assessment log to the support engineer for the given application. This gives the support engineer a fast overview of the historic performance situation and the necessary measures and hints for the most valuable areas of investigation. In addition, the system allows executing the performance assessment for a given application to get the latest improvement hint from the AI model.

Implementing software performance evaluation and support according to embodiments may offer one or more benefits. Specifically, one possible benefit is uniform application to achieve reproducible results.

Specifically, performance optimization may be the domain of human experts versed in the deepest knowledge of the technology. Performance optimization may be too complex to be effectively covered in product documentation, or to allow customers to develop a deep understanding.

Moreover, in most projects the focus of the user is on functionality: acceptable performance is taken as a given. This can lead to negative surprises regarding performance, occurring late in the application design process once key/fundamental design decisions have already been made. Hence, performance issues may arise late during development and then easily escalate. This is a lose-lose situation, because the customer implementation team is under pressure from their business, and the support team is under pressure from the customer. This leads to bad experience on either side.

By contrast, embodiments afford knowledge on performance issues early in the application design process. This avoids painful revisions late in the game.

Returning now to FIG. 1, it is noted that this particular embodiment features the performance model formation (e.g., training) as part of/internal to the performance engine. However this is not required, and in other embodiments the performance engine could apply an existing model (trained elsewhere) to the received current performance data.

Also in connection with FIG. 1, there the particular embodiment is depicted with the performance engine located outside of the database. However, this is also not required.

Alternative embodiments could leverage the processing power of an in-memory database engine (e.g., the in-memory database engine of the HANA in-memory database available from SAP SE), in order to perform one or more various functions described above.

Figure 6:
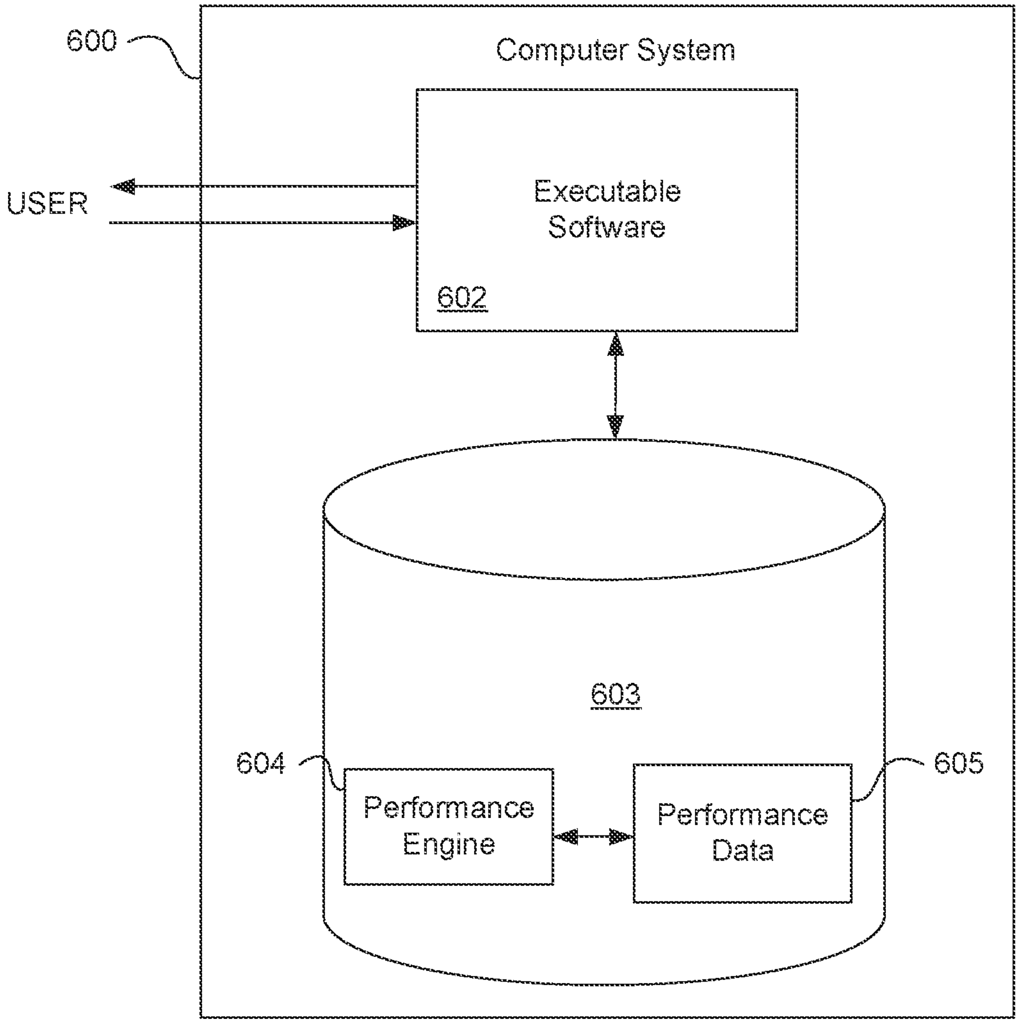
FIG. 6 illustrates hardware of a special purpose computing machine configured to implement software performance evaluation according to an embodiment.

Thus FIG. 6 illustrates hardware of a special purpose computing machine configured to perform software performance evaluation according to an embodiment. In particular, computer system 600 comprises a processor 602 that is in electronic communication with a non-transitory computer-readable storage medium comprising a database 603. This computer-readable storage medium has stored thereon code 605 corresponding to a performance engine. Code 604 corresponds to performance data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Example 1. Computer implemented systems and methods comprising:

receiving performance data of execution of a first software application on a first system, the performance data comprising a Key Performance Indicator (KPI) and a first influencing factor;

storing the performance data in a non-transitory computer readable storage medium; applying to the performance data, a performance model comprising a vector including a first dimension for the first influencing factor;

generating a prediction of the first system, from an output of the performance model; and based upon the prediction, providing a notification to an interface.

Example 2. The computer implemented systems or methods of Example 1 wherein the KPI reflects computational power, memory consumption, or bandwidth in the first system.

Example 3. The computer implemented systems or methods of Examples 1 or 2 wherein:

the first influencing factor is static according to the performance model; or the first influencing factor is dynamic according to a usage scenario.

Example 4. The computer implemented systems or methods of Example 3 wherein:

the first influencing factor is one of static or dynamic; and the vector further includes a second dimension for a second influencing factor that is the other of dynamic or static.

Example 5. The computer implemented systems or methods of Examples 1, 2, 3, or 4 further comprising training the performance model from historical performance data of a training corpus.

Example 6. The computer implemented systems or methods of Example 5 wherein:

the first system is a first tenant;

the historical performance data is received from a second system that is a second tenant; and the historical performance data is anonymized.

Example 7. The computer implemented systems or methods of Example 6 wherein the historical performance data reflects execution of the first application on the second system.

Example 8. The computer implemented systems or methods of Example 6 wherein the historical performance data reflects execution of other than the first application on the second system.

Example 9. The computer implemented systems or methods of Examples 1, 2, 3, 4, 5, 6, 7, or 8 wherein the notification comprises one or more of:

the performance data;

a warning; and a proposal.

Example 10. The computer implemented systems or methods of Examples 1, 2, 3, 4, 5, 6, 7, 8, or 9 wherein:

the non-transitory computer readable storage medium comprises an in-memory database; and an in-memory database engine of the in-memory database applies the performance model to the current performance data.

Figure 7:
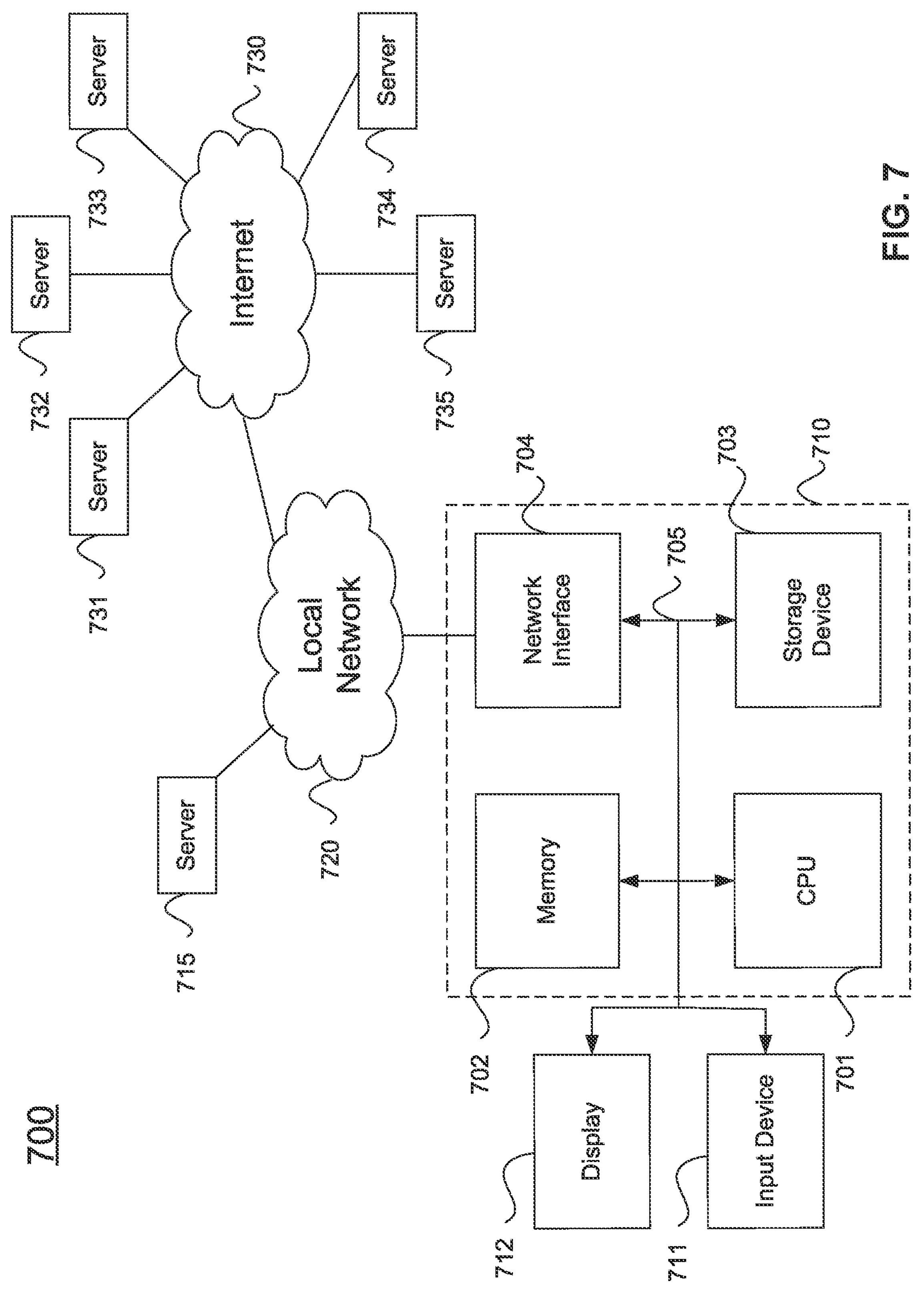
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a Light Emitting Diode (LED) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of using an artificial intelligence performance model to improve a performance of a first system, the method comprising:

receiving performance data of execution of a first software application on the first system, the performance data comprising a Key Performance Indicator (KPI) and a first influencing factor;

storing the performance data in a non-transitory computer readable storage medium;

applying to the performance data, the performance model comprising a vector including a first dimension for the first influencing factor;

generating a prediction of the first system, from an output of the performance model;

based upon the prediction, providing a notification to an interface; and adjusting a feature of the first software application in response to the prediction, wherein adjusting the feature results in a performance improvement of the first software application executed by the first system, wherein the first system operates in a first operational time and a second operational time, wherein the first operational time is a design time and the second operational time is a regular performance time that differs from the design time, wherein the vector includes a plurality of dimensions for a plurality of influencing factors, wherein the plurality of influencing factors includes a plurality of static factors and a plurality of dynamic factors, and wherein adjusting the feature of the first software application includes:

during the first operational time, adjusting the feature based on one or more of the plurality of static factors and an average of one or more of the plurality of dynamic factors, and during the second operational time, adjusting the feature based on one or more of the plurality of static factors and one or more of the plurality of dynamic factors.

2. A method as in claim 1 wherein the KPI reflects computational power, memory consumption, or bandwidth in the first system.

3. A method as in claim 1 wherein:

the first influencing factor is static according to the performance model; or the first influencing factor is dynamic according to a usage scenario.

4. A method as in claim 3 wherein:

the first influencing factor is one of static or dynamic; and the vector further includes a second dimension for a second influencing factor that is the other of dynamic or static.

5. A method as in claim 1 further comprising:

training the performance model from historical performance data of a training corpus.

6. A method as in claim 5 wherein:

the first system is a first tenant;

the historical performance data is received from a second system that is a second tenant; and the historical performance data is anonymized.

7. A method as in claim 6 wherein the historical performance data reflects execution of the first application on the second system.

8. A method as in claim 6 wherein the historical performance data reflects execution of other than the first application on the second system.

9. A method as in claim 1 wherein the notification comprises one or more of:

the performance data;

a warning; and a proposal.

10. A method as in claim 1 wherein:

the non-transitory computer readable storage medium comprises an in-memory database; and an in-memory database engine of the in-memory database applies the performance model to the current performance data.

11. A method as in claim 1 wherein adjusting the feature includes one or more of restricting a data filter in the first software application and reducing a model complexity of the first software application by simplifying calculations.

12. A method as in claim 1 wherein adjusting the feature includes one or more of reducing calculation complexity of the first software application and reducing concurrent usage of the first software application.

13. A non-transitory computer readable storage medium embodying a computer program for performing a method of using an artificial intelligence performance model to improve a performance of a first system, said method comprising:

training the performance model from historical performance data of a training corpus, the performance model comprising a vector including a first dimension;

receiving performance data of execution of a first software application on the first system, the performance data comprising a Key Performance Indicator (KPI) and a first influencing factor;

storing the performance data in a non-transitory computer readable storage medium;

applying to the performance data, the performance model with the first dimension for the first influencing factor;

generating a prediction of the first system, from an output of the performance model;

based upon the prediction, providing a notification to an interface; and adjusting a feature of the first software application in response to the prediction, wherein adjusting the feature results in a performance improvement of the first software application executed by the first system, wherein the first system operates in a first operational time and a second operational time, wherein the first operational time is a design time and the second operational time is a regular performance time that differs from the design time, wherein the vector includes a plurality of dimensions for a plurality of influencing factors, wherein the plurality of influencing factors includes a plurality of static factors and a plurality of dynamic factors, and wherein adjusting the feature of the first software application includes:

during the first operational time, adjusting the feature based on one or more of the plurality of static factors and an average of one or more of the plurality of dynamic factors, and during the second operational time, adjusting the feature based on one or more of the plurality of static factors and one or more of the plurality of dynamic factors.

14. A non-transitory computer readable storage medium as in claim 13 wherein:

the first influencing factor is static according to the performance model; or the first influencing factor is dynamic according to a usage scenario.

15. A non-transitory computer readable storage medium as in claim 14 wherein:

the first influencing factor is one of static or dynamic; and the vector further includes a second dimension for a second influencing factor that is the other of dynamic or static.

16. A computer system for using an artificial intelligence performance model to improve a performance of a first system, the computer system comprising:

one or more processors;

a software program, executable on said computer system, the software program configured to cause an in-memory database engine of an in-memory database to:

receive performance data of execution of a first software application on the first system, the performance data comprising a Key Performance Indicator (KPI) and a first influencing factor;

store the performance data in the in-memory database;

apply to the performance data, the performance model comprising a vector including a first dimension for the first influencing factor;

generate a prediction of the first system, from an output of the performance model;

based upon the prediction, provide a notification to an interface; and adjusting a feature of the first software application in response to the prediction, wherein adjusting the feature results in a performance improvement of the first software application executed by the first system, wherein the first system operates in a first operational time and a second operational time, wherein the first operational time is a design time and the second operational time is a regular performance time that differs from the design time, wherein the vector includes a plurality of dimensions for a plurality of influencing factors, wherein the plurality of influencing factors includes a plurality of static factors and a plurality of dynamic factors, and wherein adjusting the feature of the first software application includes:

during the first operational time, adjusting the feature based on one or more of the plurality of static factors and an average of one or more of the plurality of dynamic factors, and during the second operational time, adjusting the feature based on one or more of the plurality of static factors and one or more of the plurality of dynamic factors.

17. A computer system as in claim 16 wherein the in-memory database engine is further configured to train the performance model from historical performance data of a training corpus stored in the in-memory database.

18. A computer system as in claim 17 wherein:

the first system is a first tenant;

the historical performance data is received from a second system that is a second tenant; and the in-memory database engine is further configured to anonymize the historical performance data.

19. A computer system as in claim 18 wherein the historical performance data reflects execution of the first application on the second system.

20. A computer system as in claim 18 wherein the historical performance data reflects execution of other than the first application on the second system.

* * * * *